(12) United States Patent
Moos et al.

(10) Patent No.: US 6,545,117 B1
(45) Date of Patent: *Apr. 8, 2003

(54) SPRAYABLE COATING COMPOSITIONS COMPRISING AN OXAZOLIDINE FUNCTIONAL COMPOUND, AN ISOCYANATE FUNCTIONAL COMPOUND, AND A COMPOUND SELECTED FROM A MERCAPTO AND A SULFONIC ACID FUNCTIONAL COMPOUND

(75) Inventors: Jan Wilhelm Ernst Moos, Bloomfield Hills, MI (US); Jason Donald Weaver, New Baltimore, MI (US); Traci Lynne Crutchfield, Detroit, MI (US); Antonius Hendrikus Gerardus van Engelen, Alphen A/D Rijn (NL)

(73) Assignee: Akzo Noble N.V., Arnhem (NL)

( * ) Notice: Subject to any disclaimer, the term of this patent is extended or adjusted under 35 U.S.C. 154(b) by 0 days.

This patent is subject to a terminal disclaimer.

(21) Appl. No.: 09/012,166

(22) Filed: Jan. 22, 1998

Related U.S. Application Data

(63) Continuation-in-part of application No. 08/906,644, filed on Aug. 7, 1997, now abandoned, and a continuation-in-part of application No. 08/906,645, filed on Aug. 7, 1997, now Pat. No. 5,977,285.

(51) Int. Cl.$^7$ ............................................. C08G 18/30
(52) U.S. Cl. ................... 528/49; 427/385.5; 428/422.8; 428/423.1
(58) Field of Search ................... 528/49; 427/385.5; 428/422.8, 423.1

(56) References Cited

U.S. PATENT DOCUMENTS

| | | | |
|---|---|---|---|
| 3,707,521 A | * 12/1972 | De Santis | 524/506 |
| 3,743,626 A | 7/1973 | Emmons | 260/77.5 |
| 3,864,335 A | 2/1975 | Emmons | 260/240 |
| 4,002,601 A | 1/1977 | Hajek et al. | 260/77.5 |
| 4,002,637 A | 1/1977 | Lewis et al. | 206/307 |
| 4,035,557 A | 7/1977 | Jones | 526/14 |
| 4,046,744 A | 9/1977 | Jenkins | 260/77.5 |
| 4,101,527 A | 7/1978 | Cunningham et al. | 528/73 |
| 4,381,388 A | 4/1983 | Naples | 528/59 |
| 4,788,083 A | 11/1988 | Dammann et al. | 427/340 |
| 4,816,542 A | * 3/1989 | Liebl et al. | 528/59 |
| 5,126,421 A | 6/1992 | Majewski et al. | 528/44 |
| 5,143,994 A | 9/1992 | Laas et al. | 528/45 |
| 5,157,100 A | 10/1992 | Babjak et al. | 528/73 |
| 5,214,086 A | 5/1993 | Mormile et al. | 524/237 |
| 5,219,979 A | 6/1993 | Greco | 528/220 |
| 5,264,148 A | 11/1993 | Chou et al. | 252/194 |
| 5,391,614 A | 2/1995 | Chandalia et al. | 524/759 |
| 5,412,056 A | 5/1995 | Zwiener et al. | 528/73 |
| 5,461,135 A | 10/1995 | Malofsky et al. | 528/60 |
| 5,506,328 A | 4/1996 | Chandalia et al. | 528/49 |
| 5,506,329 A | 4/1996 | Chou et al. | 528/60 |
| 5,606,001 A | 2/1997 | Shaffer | 528/49 |
| 5,744,569 A | 4/1998 | Bruchmann et al. | 528/73 |

FOREIGN PATENT DOCUMENTS

| | | | |
|---|---|---|---|
| CA | 2049695 | 2/1993 | C08G/18/10 |
| EP | 183 025 | 6/1986 | C09D/17/00 |
| EP | 276 667 | 8/1988 | C08G/18/08 |
| EP | 290 157 | 11/1988 | C08K/5/42 |
| EP | 454 219 | 10/1991 | C08G/18/08 |
| EP | 499 188 | 8/1992 | C07D/263/04 |
| EP | 531 249 | 3/1993 | C08G/18/65 |
| EP | 677 541 | 10/1995 | C08G/18/24 |
| EP | 686 654 | 12/1995 | C08G/18/32 |
| GB | 992721 | 5/1961 | |
| JP | 08041424 | 2/1996 | C09D/175/04 |
| JP | 08060090 | 3/1996 | C09D/175/04 |
| WO | WO 92/13907 | 8/1992 | C08G/18/10 |
| WO | WO 93/17060 | 9/1993 | C08G/63/02 |
| WO | WO 94/27746 | 12/1994 | B05D/7/24 |
| WO | WO 95/08579 | 3/1995 | C08F/8/30 |
| WO | WO 95/14528 | 6/1995 | B01J/13/00 |
| WO | WO 95/29007 | 11/1995 | B01J/31/00 |
| WO | WO 96/08308 | 3/1996 | B01J/13/00 |
| WO | WO 96/20967 | 7/1996 | C08G/18/22 |

OTHER PUBLICATIONS

"Zoldine® RD–20", Angus Chemical Company Technical Bulletin, pp. 1–9 (1994).
Experimental Reactive Modifier QM–1007M, Rohm and Haas Company, 1990, pp. 1–19.
High Solids Isocyanat–Oxazolidine Coatings, Rohm and Haas Company, Donald C. Schall, pp. 120–139; 1985.
International Search Report, dated Dec. 11, 1998.
International Search Report, dated Nov. 27, 1998 (PCT/EP98/04942).
International Search Report, dated Dec. 4, 1998 (PCT/EP98/04943).
International Search Report, dated Dec. 11, 1998 (PCT/EP98/04944).

* cited by examiner

Primary Examiner—Rachel Gorr
(74) Attorney, Agent, or Firm—Louis A. Morris; Joan M. McGillycuddy

(57) ABSTRACT

The present invention relates to a coating composition comprising:
(a) at least one oxazolidine functional compound,
(b) at least one isocyanate functional compound, and
(c) at least one compound selected from the group consisting of a mercapto functional compound, a sulfonic acid functional compound, and mixtures thereof.

The invention further relates to a method of coating a substrate with the coating composition and to a substrate coated with the coating composition.

17 Claims, No Drawings

US 6,545,117 B1

SPRAYABLE COATING COMPOSITIONS COMPRISING AN OXAZOLIDINE FUNCTIONAL COMPOUND, AN ISOCYANATE FUNCTIONAL COMPOUND, AND A COMPOUND SELECTED FROM A MERCAPTO AND A SULFONIC ACID FUNCTIONAL COMPOUND

CROSS REFERENCE TO RELATED APPLICATIONS

This is a continuation-in-part application of U.S. Ser. No. 08/906,644, now abandoned, and Ser. No. 08/906,645, now U.S. Pat. No. 5,977,285 both filed Aug. 7, 1997.

FIELD OF THE INVENTION

The present invention relates to a new coating composition based on an oxazolidine functional compound, an isocyanate functional compound, and a compound selected from a mercapto and a sulfonic acid functional compound.

BACKGROUND OF THE INVENTION

Coatings used for painting motor vehicles and repairing the original paint are required to have good physical properties such as hardness, mechanical strength, and resistance to water, acids, and solvents. The coatings are also required to have good appearance properties, which means that films must be smooth and have a high gloss and high distinctness of image (DOI). It is also desirable that all properties be retained under prolonged outdoor weathering.

For environmental reasons, it is required to use a coating composition which can be applied easily using spray application at a low volatile organic content (VOC). Coatings with a lower organic solvent content emit lower levels of solvent when they are used and so the atmosphere becomes less polluted.

One way to achieve a lower solvent content is to use so-called high-solids compositions. Such compositions comprise a relatively high level of non-volatile materials, such as film forming polymer, pigments and fillers, and a relatively low level of organic solvent. A problem when formulating high-solids coating compositions is that such compositions have an unacceptably high viscosity due to the high molecular weight of the conventional film forming polymer. The high viscosity gives rise to problems in spray application with poor paint atomization and poor flow-out and, consequently, low gloss levels and poor appearance.

The use of low-molecular weight film forming polymers, which results in adequate application viscosities, has as a disadvantage that the resulting coating is soft and marks easily. The hardness build-up of the coating is therefore unacceptable.

Another way to reduce the amount of volatile organic compounds in coating compositions is the use of reactive diluents. Examples of reactive diluents include aldimines and ketimines. In EP-A-0 686 654 such compounds are discussed. Other reactive diluents, such as oxazolidines, are mentioned but it is stated that they have limited utility as a sole reaction partner with isocyanate because of generally slow setting film properties.

Aldimines are used as reactive diluents for low VOC paint systems. These diluents are commercially available and use of such aldimines is referred to in U.S. Pat. No. 5,214,086 and EP-A-0 686 654. In general these reactive diluents offer good cure and hardness development. However, they are known to cause skin irritation and to cause adhesion failure when applied in low VOC clearcoats.

Bicyclic oxazolidines are also used as reactive diluents for low VOC paint systems. These diluents are commercially available and use of such bicyclic oxazolidines are referred to in WO 95/14528. In general, these reactive diluents offer good durability and color stability and low toxicity. However, compositions based on bicyclic oxazolidines may exhibit an unacceptably long time to cure.

Monocyclic oxazolidines are also used as reactive diluents for low VOC paint systems. Coating compositions based on monocyclic oxazolidines are also referred to in EP 0 499 188 A1. Monocyclic oxazolidines and dimers of the same are commercially available. Coating compositions based on monocyclic oxazolidines may exhibit a loss of adhesion over time.

While the use of mono- or bi-cyclic oxazolidines has been described (see, e.g., U.S. Pat. No. 5,126,421), nowhere is there described the use of both monocyclic and bicyclic oxazolidines. WO 92/13907 refers to the use of monocyclic and bicyclic oxazolidines (page 7, lines 20–21), but this reference relates to the use of these compounds in the alternative and does not disclose a mixture of the two oxazolidines.

U.S. Pat. No. 5,506,328 refers to a two-component system with side A being an aliphatic polyisocyanate and side B being a tertiary amine catalyst and optionally an isocyanate-reactive compound selected from the group consisting of monoahls, polyols, imines, oxazolidines, or combinations thereof. The monoahl can be an -SH compound. The examples show only alcohols as monoahls. It has not been recognized by this disclosure that the combination of an oxazolidine functional compound, an isocyanate functional compound, and a mercapto functional compound shows improved and unexpected results over the use of the combination of an oxazolidine functional compound and an isocyanate functional compound alone.

Surprisingly, it was found that the addition of a mercapto functional compound to a coating composition comprising an oxazolidine functional compound and an isocyanate functional compound results in an increased potlife while maintaining the drying characteristics of the composition or results in increased drying rate while maintaining acceptable potlife.

It was also found that the addition of a sulfonic acid functional compound to a coating composition comprising an oxazolidine functional compound and an isocyanate functional compound results in improved curing characteristics of the coating composition, even at low relative humidity (e.g., 30% and below), without loss of potlife and, in some cases, with increased potlife.

It was also found that the use of mixtures of bicyclic and monocyclic oxazolidines as reactive diluents in low VOC coatings provide properties that can compete with those of imines, but without loss of adhesion.

A lower VOC at the same viscosity and a higher pot life/drying balance is obtained when using coating compositions of the present invention while other paint properties remain on the same level.

SUMMARY OF THE INVENTION

The present invention relates to a coating composition comprising:
(a) at least one oxazolidine functional compound,
(b) at least one isocyanate functional compound, and
(c) at least one compound selected from the group consisting of a mercapto functional compound, a sulfonic acid functional compound, and mixtures thereof.

Component (a) comprises at least one oxazolidine functional compound which may be a monocyclic oxazolidine functional compound, a bicyclic oxazolidine functional compound, and, preferably, mixtures thereof.

Component (b) comprises at least one isocyanate functional compound which may be an isocyanurate, a uretdione, a biuret, an allophonate, an adduct, a NCO prepolymer, or mixtures thereof.

Component (c) may be a mercapto functional compound, preferably a mercapto functional silane, most preferably γ-mercapto-propyl-trimethoxysilane. Component (c) may also be a sulfonic acid functional compound, preferable p-toluene sulfonic acid or dodecyl benzene sulfonic acid. Component (c) more preferably comprises a mixture of mercapto and sulfonic acid functional compounds, most preferably a mixture of γ-mercapto-propyl-trimethoxysilane and p-toluene sulfonic acid.

The composition may also further comprise:

(d) a resin comprising a functional group selected from hydroxyl and amine.

The invention further relates to a method of coating a substrate with the coating composition and to a substrate coated with the coating composition.

DETAILED DESCRIPTION OF THE INVENTION

Component (a) comprises at least one oxazolidine functional compound. Preferably, the oxazolidine functional compound has the formula:

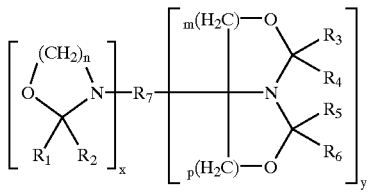

(I)

wherein
- x and y are independently selected from 0 to 10, with the proviso that x and y cannot both be 0;
- n is selected from the integers 2 or 3;
- m and p are independently selected from the integers 1 or 2;
- $R_1$, $R_2$, $R_3$, $R_4$, $R_5$ and $R_6$ may be the same or different and are selected from the group of hydrogen, linear or branched (cyclo)alkyl, and linear or branched aryl, optionally substituted;
- $R_1$ and $R_2$, $R_3$ and $R_4$, and $R_5$ and $R_6$ may be joined together to form a 5 or 6 carbon ring with the attached carbon atom of the ring in the formula, i.e. $R_1$ and $R_2$, $R_3$ and $R_4$, and $R_5$ and $R_6$ collectively represent a tetramethylene or a pentamethylene group; and
- $R_7$ is a mono- or multivalent aliphatic, aromatic, arylaliphatic or cycloaliphatic moiety which may optionally contain oxygen, nitrogen, sulphur, and silica, and $R_7$ may be H when x or y is zero.

The variables recited in the formula are intended to be chosen independently both within one moiety, from one moiety to the next, and from one compound to the next.

More preferably, the oxazolidine functional compound is selected from one of the following formulae II (monocyclic oxazolidine functional compounds) and III (bicyclic oxazolidine functional compounds).

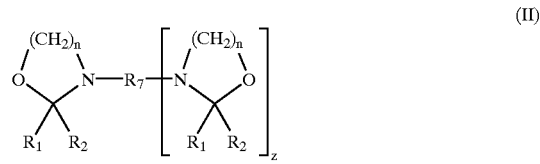

(II)

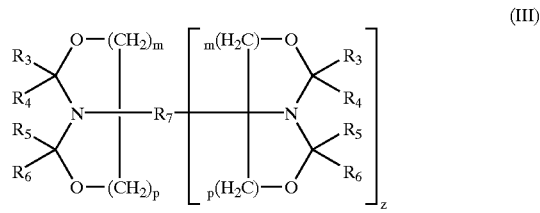

(III)

wherein n, m, p, $R_1$, $R_2$, $R_3$, $R_4$, $R_5$, $R_6$, and $R_7$ are as mentioned above and z is from 0 to 9.

Preferably, n is 2 and m and p are 1. Preferably, z is from 0 to 3.

Preferably, $R_1$, $R_2$, $R_3$, $R_4$, $R_5$, and $R_6$ are selected from the group of hydrogen, phenyl, benzyl or a linear or branched $C_{1-12}$ alkyl group. More preferably, $R_1$, $R_2$, $R_3$, $R_4$, $R_5$, and $R_6$ are selected from the group of hydrogen and isopropyl.

In formula II, preferably, $R_7$ is multivalent and more preferably $R_7$ is an aliphatic, arylaliphatic or cycloaliphatic moiety comprising 2 to 15 carbon atoms and, optionally, ester, carbonate, and urethane groups. Monocyclic oxazolidine functional compounds wherein $R_7$ comprises ester groups may be based on acrylate polymers such as described in GB-B-992,721.

More preferably, z is 1 and $R_7$ is a divalent moiety comprising either a carbonate group or at least two urethane groups.

Compounds having an $R_7$ group comprising carbonate groups are described in EP-A-0 499 188. $R_7$ may be for example

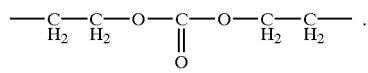

When $R_7$ comprises at least two urethane groups, $R_7$ may be selected from the group of the following multivalent moieties:

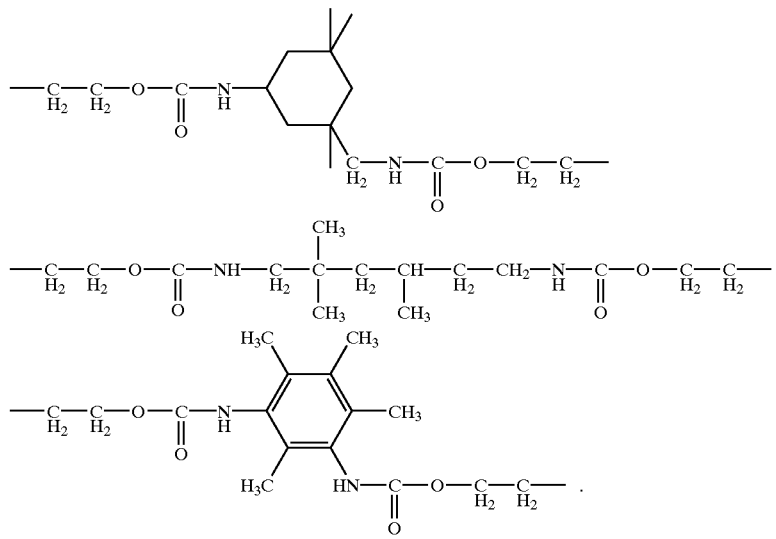

Most preferably, z is 1, n is 2, $R_1$ is hydrogen, $R_2$ is isopropyl, and $R_7$ is:

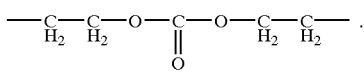

This embodiment is commercially available under the tradename "INCOZOL™" LV (from Industrial Copolymers Ltd., Preston, Lancashire, UK).

Component (a) may comprise a mixture of monocyclic oxazolidine functional compounds according to formula II.

In formula III, preferably, z is 0 and $R_7$ is an alkyl group comprising 1 to 10 carbon atoms, more preferably methyl, ethyl or propyl. Most preferably, the oxazolidine functional compound comprises 1-aza-3,7-dioxo-2,8-diisopropyl-5-ethyl bicyclo(3,3,0)octane, which is available commercially under the tradename "ZOLDINE®" RD-20 from Angus Chemical Company (Buffalo Grove, Ill.) and has the structure:

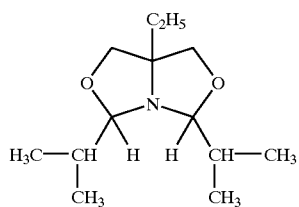

Component (a) may comprise a mixture of bicyclic oxazolidine functional compounds according to formula III.

Most preferably, component (a) comprises a mixture of a monocyclic oxazolidine functional compound of the formula II and a bicyclic oxazolidine functional compound of the formula III. When such a mixture is used, the weight ratio of a bicyclic oxazolidine functional compound of the formula III to a monocyclic oxazolidine functional compound of the formula II is preferably in the range of 5:1 to 1:5, more preferably 3:1 to 1:3, most preferably, 1:1 ratio.

Component (b) comprises at least one isocyanate functional compound. The isocyanate functional compound can be an aromatic, aliphatic, cycloaliphatic and/or araliphatic isocyanate functional compound. The isocyanate functional compound can be an isocyanurate, uretdione, biuret, allophanate, an adduct, NCO prepolymers, or mixtures thereof.

Examples of suitable isocyanates to be used as the isocyanate functional compound, or as starting materials for preparing an isocyanate functional compound comprising an isocyanurate, biuret or uretdione structure include organic polyisocyanates represented by the formula $$R(NCO)_k$$

wherein k is 2 or higher and R represents an organic group obtained by removing the isocyanate groups from an organic polyisocyanate having aromatically or (cyclo)aliphatically bound isocyanate groups. Preferred diisocyanates are those represented by the above formula wherein k is 2 and R represents a divalent aliphatic hydrocarbon group having 2 to 18 carbon atoms, a divalent cycloaliphatic hydrocarbon group having 5 to 15 carbon atoms, a divalent araliphatic hydrocarbon group having 7 to 15 carbon atoms or a divalent aromatic hydrocarbon group having 6 to 15 carbon atoms. Examples of the organic diisocyanates which are particularly suitable include ethylene diisocyanate, 1,3-propylene diisocyanate 1,4-tetramethylene diisocyanate, 1,6-hexamethylene diisocyanate, 2,2,4-trimethyl-1,6-hexamethylene diisocyanate, 2-methyl-1,5-diisocyanate pentane, 2-ethyl-1,4-diisocyanate butane, 1,12-dodecamethylene diisocyanate, cyclohexane-1,3- and -1,4-diisocyanate, 1-isocyanato-2-isocyanatomethyl cyclopentane, isophorone diisocyanate, bis-(4-isocyanatocyclohexyl)-methane, 2,4'-dicyclohexylmethane diisocyanate, 1,3- and 1,4-bis(isocyanatomethyl)-cyclohexane, bis-(4-isocyanato-3-methyl-cyclohexyl)-methane, 1-methyl-2,4-diisocyanato cyclohexane, 1-isocyanato-1-methyl-4(3)-isocyanatomethyl cyclohexane, xylene diisocyanate, 1-methyl-2,4-diisocyanato benzene, α,α,α',α'-tetramethyl-1,3- and -1,4-xylylene diisocyanate, 2,4- and 2,6-hexahydrotoluylene diisocyanate, 1,3- and 1,4-phenylene diisocyanate, 2,4- and 2,6-toluylene diisocyanate, 2,4- and 4,4'-diphenylmethane diisocyanate, 1,5-diisocyanato naphthalene and mixtures thereof. Aliphatic polyisocyanates containing 3 or more isocyanate groups such as 4-isocyanatomethyl-1,8-octane diisocyanate and aromatic polyisocyanate containing 3 or more isocyanate groups such as 4,4',4"-triphenylmethane triisocyanate, 1,3, 5-triisocyanate benzene, polyphenyl polymethylene polyisocyanates obtained by phosgenating aniline/formaldehyde condensates, and mixtures thereof may also be used.

Isocyanate functional compound comprising an allophanate structure are prepared by the reaction of the above-mentioned organic polyisocyanates with a mono- or polyalcohol. Preferably, isocyanate functional compound comprising an allophanate structure are prepared from 1,6-hexamethylene diisocyanate and/or isophorone diisocyanate reacted with an alcohol, preferably butanol. Other allophanate structures are disclosed in copending application having U.S. Ser. No. 08/906,644, filed Aug. 7, 1997, which is hereby incorporated by reference.

Polyisocyanate adducts include the adduct of trimethylol propane and m-tetramethylxylylene diisocyanate and the adduct of trimethylol propane and toluene diisocyanate.

The NCO prepolymers are prepared from the previously described monomeric polyisocyanates, preferably monomeric diisocyanates, and organic compounds containing at least two isocyanate-reactive groups, preferably at least two hydroxy groups. These organic compounds include high molecular weight compounds having number average molecular weights of 400 to about 6,000, preferably 800 to about 3,000, and optionally low molecular weight compounds with molecular weights below 400. Products obtained by reacting polyisocyanates exclusively with low molecular weight compounds are polyisocyanate adducts containing urethane groups and are not considered to be NCO prepolymers.

Preferably, component (b) comprises diisocyanates selected from 1,6-hexamethylene diisocyanate (HDI), isophorone diisocyanate (IPDI), and toluene diisocyanate (TDI). More preferably, component (b) comprises the isocyanurate and uretdione structures of HDI, IPDI, and TDI. Most preferably, component (b) is the isocyanurate of HDI.

Component (c) comprises at least one compound selected from the group consisting of a mercapto functional compound, a sulfonic acid functional compound, and mixtures thereof.

The mercapto functional compound is preferably a compound having primary mercapto groups. Examples include pentaerythritol tetra(3-mercaptopropionate), pentaerythritol tetra(thioglycolate), trimethylol propane tri(3-mercaptopropionate), trimethylol propane tri(thioglycolate), and mercapto functional silane compounds, such as γ-mercapto-propyl-trimethoxysilane, γ-mercapto-propyl-triethoxysilane, γ-mercapto-propyl-methyldimethoxysilane, β-mercapto-ethyl-trimethoxysilane, and β-mercapto-ethyl-triethoxysilane. Most preferably, γ-mercapto-propyl-trimethoxysilane, available from Hüls under the tradename "DYNASYLAN MTMO" is used.

The mercapto functional compound is preferably present in an amount of about 0.1 to about 2.0 wt. % of a ready-to-spray coating composition, more preferably about 0.2 to about 0.6 wt. %, most preferably about 0.2 to about 0.4 wt. %. The optimum amount is dependent on the amount of catalyst.

The use of the mercapto functional compound has been shown to increase potlife while maintaining similar drying characteristics or of increasing the drying rate while maintaining acceptable potlife.

While not wishing to be bound by theory, it is believed that these unexpectedly superior results are related to the complexing nature of sulfur atoms. The mercapto group is thought to complex the commonly used tin catalyst in the cup, whereas surprisingly the curing is not adversely affected.

The sulfonic acid functional compound can be a strong acid such as p-toluene sulfonic acid or dodecyl benzene sulfonic acid. The amount added depends on the sulfonic acid functional compound used. The sulfonic acid functional compound can be present in an amount of about 0.2 to 2.0 wt. %, more preferably 0.3 to 1.6 wt. %, most preferably 0.6 to 1.0 wt. % of a ready-to-spray coating composition.

The addition of the sulfonic acid functional compound surprisingly imparts improved curing characteristics to the coating composition. It can be cured without leaving a tacky film, even at low relative humidity (at or below 30%). There is no adverse effect on the potlife, and, in fact, the potlife may show an increase in some cases.

While not wishing to be bound by theory, it is believed that the sulfonic acid functional compound breaks open the oxazolidine structures, and it is surprising that this does not reduce potlife. Other acids such as organic and metallic acids were tested but none were found to provide the same benefits as sulfonic acid functional compounds.

Component (d) comprises a resin comprising a functional group selected from hydroxyl and amine. The hydroxyl functional resin may be an acrylic, polyester, polyether, polyurethane functional resin or other constituent materials known in the art, and may be a mixture thereof. Examples include hydroxyl-functional binders, e.g., polyester polyols such as described in H. Wagner et al., *Lackkunstharze*, 5th ed., 1971 (Carl Hanser Verlag, Munich), polyether polyols, polyacrylate polyols, polyurethane polyols, cellulose acetobutyrate, hydroxyl-functional epoxy resins, alkyds, ketone resins, and dendrimeric polyols such as described in WO 93/17060 Also, hydroxyl-functional oligomers and monomers, such as castor oil and trimethylolpropane may be present.

Alternately, component (d) comprises an amine functional resin. Suitable compounds may be aliphatic, aromatic, cycloaliphatic and/or araliphatic, may contain a saturated, an unsaturated group, O, S or N, and include ethylene diamine, ethylene glycol diamine, propylene glycol diamine, and cycloaliphatic diamines. Examples include aspargyl acid esters, and latent or non-latent amino-functional compounds such as ketimines, aldimines, diimines, secondary amines, and polyamines may be present. These and other compounds are known to the skilled person and are mentioned, int. al., in U.S. Pat. No. 5,214,086. Preferably, the amine functional resin is an aspartic acid ester. Suitable resins are available commercially from Bayer under the tradenames "Desmophen®" XP 7052 (sterically hindered amines—adduct of 2 moles diethylmaleate with the amine "Laromin®" C 260 (BASF, Germany)) and "Desmophene®" XP 7053 (adduct of 2 moles diethylmaleate with the amine PACM 20).

Preferably, component (d) is a hydroxyl functional resin.

Preferably, the percentages by weight of components (a) to (d) on total vehicle solids are about: (a) 5–60 wt. %, (b) 30–70 wt. %, (c) 0.3–4.0 wt. %, and (d) 0–30 wt. %.

The coating composition of the present invention may also comprise hydroxyl or other functional reactive diluents, which may lower the viscosity, lower the VOC and boost the reactivity of the coating composition.

Preferably, the ratio of isocyanate groups to isocyanate-reactive groups is 0.25 to 1.5, preferably 0.75 to 1.25.

The coating composition of the present invention may also comprise additional components such as solvents, catalysts, stabilizers, fillers, rheology control agents, flow additives, leveling additives, dispersing agents and other components known to persons skilled in the art. Suitable solvents include methyl amyl ketone, butyl acetate, amyl acetate, ethoxy ethyl propionate and xylene. Suitable catalysts include aromatic or aliphatic carboxylic acids, and organometal compounds. Acids which are useful are formic acid, acetic acid, mono-, di-, and trichloro acetic acid, oxalic acid, maleic acid, malonic acid, fumaric acid, heptanoic acid, pelargonic acid, isononanoic acid, benzoic acid, 4-hydroxybenzoic acid, mono-, di-, and trichlorobenzoic acid, and salicylic acid and anhydrides thereof. Preferred acids are acetic acid, heptanoic acid, and benzoic acid. Useful organometal compounds include zinc alkanoate, such as zinc octoate, dibutyltin dilaurate, dibutyltin (bis) mercaptide, dibutyltin diacetate, and dibutyltin sulphide. Preferred is an organo-tin catalyst such as dibutyltin dilaurate. Also mixtures of the above-mentioned catalysts may be used.

Optionally pigments may be present in the coating composition of the present invention. Useful pigments are various types common to the art which include but are not limited to titanium dioxide, graphite, carbon black, zinc oxide, calcium sulphide, chromium oxide, zinc sulphide, zinc chromate, strontium chromate, barium chromate, lead chromate, lead cyanamide, lead silico chromate, yellow nickel titanium, yellow chromium titanium, red iron oxide, yellow iron oxide, black iron oxide, naphtol red and browns, anthraquinones, dioxa zinc violet, isoindoline yellow, arylide yellow and oranges, ultramarine blue, phthalocyanine complexes, amaranth, quinacridones, halogenated thioindigo pigments, extender pigments such as magnesium silicate, aluminum silicate, calcium silicate, calcium carbonate, fumed silica, barium sulfate, and zinc phosphate.

Preferably, the coating composition comprises less than 500 g/l (4.2 lbs/gal) of volatile organic solvent based on the total composition, more preferably less than 480 g/l (4.0 lbs/gal), most preferably less than 420 g/l (3.5 lbs/gal). The solid resin content preferably is higher than 50%, more preferably higher than 52%, most preferably higher than 58%.

Coating compositions of the present invention are useful as clearcoats, basecoats, topcoats, and primers.

The coating composition of the present invention can be used in the preparation of coated substrates. These substrates include glass, ceramics, paper, wood, plastic and metal.

The coating compositions may be formulated in a 2-, 3-, or 4-component system, depending on the choice of the components (a), (b), (c), and, optionally, (d). For example, the sulfonic acid functional compound may be added as the fourth component to a 3-component system consisting of component (a), (b), and (d) or it can be added as part of one of the existing components, such as component (d).

The coating composition is especially useful in the refinish industry, in particular the body shop, to repair automobiles. The coating composition is also applicable in the automotive industry for the finishing of large transport vehicles, such as trains and buses, and can also be used in airplanes. The substrate may be uncoated material or can be primed. The substrate may also be coated with paint products applied at the time of manufacture or just prior to application of the compositions of the present invention. The coating composition can be applied using conventional spray equipment or high volume low-pressure spray equipment resulting in a high quality finish. Other modes of application are roller coating, brushing, sprinkling, flow coating, dipping, electrostatic spraying or electrophoresis, with spraying being preferred. Exemplary metal substrates include steel, aluminum, copper, zinc, magnesium, and alloys thereof. Curing temperatures are preferably between 0 and 80° C., and more preferably between 20 and 60° C.

The following examples illustrate the preparation of compositions according to the present invention. The examples are illustrative of the invention and contain a best mode. Comparative examples are included to illustrate the benefits of the present invention over other systems.

EXAMPLES

The following compounds were used.

Acrylate Polyol

This is a 66% solids solution in n-butyl acetate of an acrylate polyol with the following monomer composition:

hydroxy ethyl methacrylate (39.8 wt. %), styrene (15.0 wt. %), methyl methacrylate (15 wt. %), n-butyl methacrylate (19.6 wt. %), n-butyl acrylate (9.8 wt. %), and methacrylic acid (0.8 wt. %)

The solid resin has an acid number of 7 mg KOH/gram and a hydroxyl number of 170 mg KOH/gram, both based on solids. Number average molecular weight is 1780, weight average molecular weight is 3800, as measured by gel permeation chromatography using polystyrene as a standard. The resin solution has a viscosity of 3.0 Pa.s at 23° C. The resin is prepared by the well known method of feeding the monomers to the reactor over an appropriate time period and allowing polymerization until all monomers are essentially converted.

Polyester Polyol 1

Into a 10 liter round bottom reaction vessel equipped with a stirrer, packed column, condenser, heating mantle, thermometer, and nitrogen inlet, were charged:

2608 g of hexahydrophthalic anhydride, 2981 g of trimethylol propane, 2015 g of isononanoic acid, 195 g of phthalic anhydride, and 9.2 g of an aqueous solution comprising 85% phosphoric acid.

The reaction mixture was heated under a nitrogen stream of 10 liter/hour. The temperature of the mixture was gradually raised to 240° C. The reaction water was distilled off at a rate such that the temperature at the top of the packed column did not exceed 103° C. After the reaction was run at 240° C. for one hour, the nitrogen stream was increased to 50 liter/hour and the reaction continued at 240° C. until an acid value of 9.3 was reached. The reaction mixture was then cooled to 130° C. and diluted with 1,817 g of butylacetate.

A polyester polyol solution was obtained having a solids content of 80.5%, a viscosity of 7.5 Pa.s measured at 20° C., an acid value of 9.3 mg KOH/gram and a hydroxyl value of 145 mg KOH/gram, both based on solids. The polyester polyol had a Tg of –2° C. Number average molecular weight is 1900, weight average molecular weight is 4500 as measured by gel permeation chromatography using polystyrene as a standard.

Polyester Polyol 2

This is a 85% solids solution in n-butyl acetate of a polyester polyol with the following monomer composition:

1,4-cyclohexanedimethanol (1.37 moles)

hexahydrophthalic anhydride (5.53 moles), adipic acid (2.77 moles), trimethylolpropane (2.77 moles) and 3,5,5 trimethylhexanoic acid i.e. iso-nonanoic acid (5.87 moles).

The resin has an acid number of 10 mg KOH/gram and a hydroxyl number of 170 mg KOH/gram, both based on solids. Number average molecular weight is 800, weight average molecular weight is 2300 as measured by gel permeation chromatography using polypropylene glycol as a standard.

The resin solution has a viscosity of 7.5 Pa.s at 23° C. The polyester is prepared according to well known techniques: condensation of the monomers under removal of esterification water.

Incozol® LV available from Industrial Copolymers Ltd., Preston, Lancashire, UK, is the reaction product of 1 mole of diallyl carbonate and 2 moles of Incozol® 3 available from Industrial Copolymers Ltd.

Zoldine® RD20 LC is 1-aza-3,7-dioxo-2,8-diisopropyl-5-ethyl bicyclo(3,3,0)octane available from Angus Chemical Company, Buffalo Grove, Ill.

Desmodur® N3390 is an isocyanate functional compound based on the isocyanurate of hexamethylene diisocyanate available from Bayer, Pittsburgh, Pa. (solids content is 90% in butylacetate).

Fascat 4202 is a tin catalyst ex Elf Atochem (Philadelphia, Pa.)

Byk 310 is a levelling agent ex Byk Chemicals, Wallington, Conn.

TINUVIN 292 and 384 are hindered amine light stabilizers (HALS) available from CIBA-GEIGY, Tarrytown, N.Y.

DYNASYLAN MTMO is γ-mercapto-propyl-trimethoxysilane, available from Hüls, Chicago, Ill.

Example 1

A clearcoat according to the present invention was prepared as follows. The compounds are listed in order of addition. All compounds were added while stirring and were mixed on an air mixer for a minimum of 20 minutes after the addition was complete.

| Clear Formulation | |
|---|---|
| ACRYLATE POLYOL | 47.84 g |
| POLYESTER POLYOL 1 | 13.46 g |
| POLYESTER POLYOL 2 | 4.70 g |
| 20% BYK 310 in butyl acetate | 0.79 g |
| butyl acetate | 3.13 g |
| 10% FASCAT 4202 in butyl acetate | 1.47 g |
| DYNASYLAN MTMO | 0.98 g |
| TINUVIN 292 | 2.45 g |
| TINUVIN 384 | 4.89 g |
| isobutyl acetate (urethane grade) | 20.29 g |
| Total | 100 g |
| VOC | 3.76 Lbs/Gal |
| Hardener Formulation | |
| DESMODUR N-3390 | 83.84 g |
| methyl n-propyl ketone | 16.16 g |
| Total | 100 g |
| VOC | 2.17 Lbs/Gal |
| Activator Formulation | |
| ZOLDINE RD-20 | 49.03 g |
| INCOZOL LV | 49.01 g |
| xylene (tech grade) | 1.96 g |
| Total | 100 g |
| VOC | 0.017 Lbs/Gal |
| Clearcoat composition | |
| Clear formulation | 29.71 g |
| Hardener formulation | 47.53 g |
| Activator formulation | 22.76 g |
| Total | 100 g |
| VOC | 2.2 Lbs/Gal |

Experimental Procedure

An E-coated cold rolled steel panel was prepared as follows:

The steel panel was degreased with M600 Degreaser (commercially available from Akzo Nobel Coatings Inc., Norcross Ga.) and scuffed with a red Scotch Brite pad. Then the panel was degreased again with M600.

"AUTOBASE" (commercially available from Akzo Nobel Coatings) was reduced with AUTOBASE Reducer Medium (commercially available from Akzo Nobel Coatings) at a 1:1 mixing ratio (by volume). To that mixture was added 10% AUTOBASE Atomizing Agent (Akzo Nobel Coatings). The following AUTOBASE color formula was used:

| | wt. % (before addition of reducer) |
|---|---|
| toner 777 | 9 |
| toner 666 | 9 |
| toner 333C | 36 |
| toner 956 | 36 |
| Hardener | 10 |

After reduction with AUTOBASE Reducer Medium and AUTOBASE Atomizing Agent, three coats plus one drop coat of basecoat was applied using a SATA $NR_{95}$ HVLP spray gun (with 1.3 tip set) at 10 psi air pressure at the gun at about 70° F. and about 20% relative humidity. A 5–10 min. flash was given between coats and 30 minutes before application of the clearcoat.

The composition of Example 1 was applied in two coats, whereby the first coat was sprayed as a thin coat in order to achieve lower total film build, by means of HVLP spraying (SATA NR95 with 1.5 tip set at 10 psi) at about 70° F. and about 20% relative humidity. The first coat was allowed to flash for 10 minutes before application of the second coat. The clearcoat was applied to a dry film build of approximately 25 mils. The clearcoat was baked for 15 minutes at 140° F. The properties of the coating are shown in Table 1.

Example 2

To 250 grams of ready-to-spray clearcoat composition of Example 1 was added 15 grams of a solution of:
33.3 parts 40% active p-toluene sulfonic acid solution in isopropanol
66.7 parts n-butanol.

The p-toluene sulfonic acid was present in 0.8 wt. % in the ready-to-spray clearcoat composition.

The clearcoat composition was applied as in Example 1. Properties of the coating are listed in table 1.

TABLE 1

|  | Ex. 1 | Ex. 2 |
| --- | --- | --- |
| Persoz Hardness after 7 days at RT | 166 sec. | 166 sec. |
| Potlife time span between initial viscosity and 20 sec. measured in DINC 4 | 60 min. | 60 min. |
| Tack free | after 15 min. at 60° C. and 3 hrs at RT | after 15 min. at 60° C. |

RT = room temperature

The clearcoat of Example 1 comprising a mercapto functional compound showed an increase in the drying rate while the potlife was maintained when compared with a clearcoat composition prepared previously that did not contain a mercapto functional compound.

The clearcoat of Example 2 comprising a mixture of a mercapto functional compound and a sulfonic acid functional compound showed a cure without leaving a tacky film at less than 30% relative humidity. Potlife was not adversely affected, and in some runs an increase in potlife was seen.

A similar composition comprising only the sulfonic acid functional compound was shown to dry very quickly, but potlife was reduced, which required adjustment of the level of tin catalyst in order to achieve acceptable potlife.

One skilled in the art will appreciate that the present invention can be practiced by other than the described embodiments, which are presented for purposes of illustration and not of limitation, and the present invention is limited only by the claims that follow.

We claim:

1. A coating composition comprising:
   (a) at least one oxazolidine functional compound,
   (b) at least one isocyanate functional compound, and
   (c) at least one mercapto functional compound.

2. The coating composition of claim 1 wherein component (a) comprises at least one oxazolidine functional compound selected from a monocyclic oxazolidine functional compound, a bicyclic oxazolidine functional compound, and mixtures thereof.

3. The coating composition of claim 1 wherein component (b) comprises at least one isocyanate having a isocyanurate structure.

4. The coating composition of claim 1 wherein component (c) comprises a mercapto functional silane.

5. The coating composition of claim 4 wherein the mercapto functional silane comprises γ-mercapto-propyl-trimethoxysilane.

6. The coating composition of claim 1 further comprising:
   (d) a sulfonic acid functional compound.

7. The coating composition of claim 6 wherein component (d) comprises p-toluene sulfonic acid.

8. The coating composition of claim 6 wherein component (d) comprises dodecyl benzene sulfonic acid.

9. The coating composition of claim 6 wherein components (c) and (d) comprises a mixture of a mercapto functional silane and a sulfonic acid functional compound.

10. The coating composition of claim 8 wherein components (c) and (d) comprises γ-mercapto-propyl-trimethoxysilane and p-toluene sulfonic acid.

11. The coating composition of claim 1 further comprising:
    (e) a resin comprising a functional group selected from hydroxyl and amine.

12. A method of coating a substrate comprising coating the substrate with the coating composition of claim 1.

13. A coated substrate coated with the composition of claim 1.

14. A coating composition comprising a mixture of:
    (a) at least one oxazolidine functional compound,
    (c) at least one mercapto functional compound.

15. A method of making a coating composition comprising mixing:
    (a) at least one oxazolidine functional compound,
    (b) at least one isocyanate functional compound, and
    (c) at least one mercapto functional compound.

16. The coating composition of claim 14 further comprising:
    (d) a sulfonic acid functional compound.

17. The coating composition of claim 15 further comprising:
    (d) a sulfonic acid functional compound.

* * * * *